US012691393B2

(12) United States Patent
Meduri et al.

(10) Patent No.: US 12,691,393 B2
(45) Date of Patent: Jul. 28, 2026

(54) PARTICULATE RESTRICTION FOR FLUID PUMPS

(71) Applicants: Baker Hughes Energy Technology UK Limited, Bristol (GB); Baker Hughes Holdings LLC, Houston, TX (US)

(72) Inventors: Uday Meduri, Bangalore (IN); Carlo Maria Martini, Florence (IT); Manuele Bigi, Calenzano (IT); Saminathan Mani, Bangalore (IN); Subrata Pal, Bangalore (IN)

(73) Assignees: Baker Hughes Energy Technology UK Limited, Bristol (GB); Baker Hughes Holdings LLC, Houston, TX (US)

( * ) Notice: Subject to any disclaimer, the term of this patent is extended or adjusted under 35 U.S.C. 154(b) by 406 days.

(21) Appl. No.: 17/557,993

(22) Filed: Dec. 21, 2021

(65) Prior Publication Data

US 2023/0191289 A1     Jun. 22, 2023

(51) Int. Cl.
*B01D 21/26* (2006.01)
*F04D 1/06* (2006.01)
(Continued)

(52) U.S. Cl.
CPC ............. *B01D 21/262* (2013.01); *F04D 1/06* (2013.01); *F04D 29/086* (2013.01); *F04D 29/445* (2013.01)

(58) Field of Classification Search
CPC .......... E21B 43/128; F04D 1/06; F04D 13/10; F04D 7/04; F04D 31/00
See application file for complete search history.

(56) References Cited

U.S. PATENT DOCUMENTS 2,311,963 A * 2/1943 Pyle ........................ F04D 13/10
                                                    96/194
3,446,150 A     5/1969 Dee
(Continued)

FOREIGN PATENT DOCUMENTS

CN          210317880 U     4/2020
WO          2009/131462     10/2009
WO          2015/095886     6/2015

OTHER PUBLICATIONS

Ina Ekeberget et al., "Sand Management and Erosion Prediction in Subsea Multiphase Pumps," Turbo machinery Laboratory, Texas A&M Engineering Experiment Station, Sep. 9-12, 2019, 16 pages.
(Continued)

*Primary Examiner* — Nathaniel E Wiehe
*Assistant Examiner* — Jackson N Gillenwaters
(74) *Attorney, Agent, or Firm* — Hogan Lovells US LLP

(57) ABSTRACT

A pump for use with fluids having particulates has an inlet to allow the fluids into a chamber of the pump. The chamber has a direct flow path of at least one larger width than a side flow path, and has a movable blade and diffuser stack within the chamber. Power features of the pump cause the movable blade to impart a centrifugal force on the fluids within the chamber, while at least one protrusion located circumferentially with respect to the chamber causes the particulates of a direct flow path to gather or causes the particulates to divert from a direction associated with at least one cavity of the chamber.

20 Claims, 10 Drawing Sheets

(51) Int. Cl.
    *F04D 29/08*       (2006.01)
    *F04D 29/44*       (2006.01)

(56)              References Cited

U.S. PATENT DOCUMENTS

| | | | | |
|---|---|---|---|---|
| 5,209,650 | A * | 5/1993 | Lemieux | F04D 29/0413 |
| | | | | 415/199.5 |
| 6,447,269 | B1 * | 9/2002 | Rexroth | F04D 29/588 |
| | | | | 417/370 |
| 9,638,375 | B2 | 5/2017 | Hollingsaeter | |
| 10,082,149 | B2 | 9/2018 | Meuter | |
| 10,294,949 | B2 * | 5/2019 | Bergamini | F04D 3/00 |
| 10,473,106 | B2 | 11/2019 | Parmeter | |
| 11,639,723 | B2 * | 5/2023 | Landi | H02K 7/14 |
| | | | | 417/420 |
| 2017/0241428 | A1 | 8/2017 | Ye | |
| 2017/0248159 | A1 * | 8/2017 | Rao | F04D 29/669 |
| 2018/0223854 | A1 * | 8/2018 | Brunvold | F04D 29/041 |

OTHER PUBLICATIONS

Hua et al., "Comparison of Multiphase Pumping Technologies for Subsea and Downhole Applications," Society of Petroleum Engineers, Feb. 2012, 11 pages.
International Search Report and Written Opinion mailed Mar. 31, 2023 in corresponding PCT Application No. PCT/EP2022/025579.

\* cited by examiner

PARTICULATE RESTRICTION FOR FLUID PUMPS

BACKGROUND

1 Field of Invention

This invention relates in general to fluid pumps and, more particularly, to a helico-axial, radial, or mixed flow pumping systems for pumping fluids.

2. Description of the Prior Art

Fluids, in oil production and other environments, may include gaseous and liquid components. Such fluids may be single phase or two-phase fluids that may exist in subterranean and in subsea regions familiar to oil production technologies. Oil production technologies may include submersible pumps or pumping systems that may include helico-axial and radial pumps. Such pumps may be deployed into wells to retrieve petroleum-related fluids for separation or purification. Such pumps may include stacks or stages of impeller and diffuser combinations. An impeller rotates within or associated with stationary diffusers. An impeller, in action, imparts kinetic energy to a fluid so that a portion of such kinetic energy may be converted to pressure as the fluid passes through the diffuser. Such fluids may include sand as particulates and pumps or pupping systems used with these fluids are frequently required to handle these particulates. The particulates can cause erosion in a flow path within a pump or pumping system and may also be trapped inside secluded cavities therein. Inertial devices may be provided, but a balancing drum cavity continues to suffer from erosion and from ingress of sand.

SUMMARY

In at least one embodiment, a system for use with fluids having particulates is disclosed. Such a system has an inlet to allow the fluid into a chamber of a system. The chamber has a side flow path including a smaller width than a main flow path. The side flow path is further located between at least one movable blade and at least one diffuser. Power features of the system can cause the at least one movable blade to impart a centrifugal force to the fluid within the chamber. At least one protrusion is located on an inner surface of the side flow path and between the at least one movable blade and the at least one diffuser. The at least one protrusion can cause the particulates to gather or to cause the particulates to divert from a direction associated with at side flow path.

In at least one embodiment, a pump to work with particulates of a fluid is disclosed. At least one protrusion of the system is to be located on an inner surface of a side flow path that is distinct from a main flow path within the pump. The at least one protrusion is further be located between at least one movable blade and at least one diffuser, so that the at least one protrusion can cause the particulates to gather or can cause the particulates to divert from a first direction associated with the side flow path and into a second direction associated with the main flow path.

In at least one embodiment, a method for a pump to be used with a fluid having particulates is disclosed. The method includes providing an inlet to allow the fluid into a chamber of the pump. The chamber has a side flow path of a smaller width than a main flow path. The side flow path is also located between at least one movable blade and at least one diffuser. The method includes enabling, using power features associated with the pump, the at least one movable blade to impart a centrifugal force to the fluid within the chamber. The method includes enabling at least one protrusion to cause the particulates to gather or to cause the particulates to divert from a direction associated with the side flow path. The at least one protrusion can be located on an inner surface of the side flow path and between the at least one movable blade and the at least one diffuser.

BRIEF DESCRIPTION OF THE DRAWINGS

Various embodiments in accordance with the present disclosure will be described with reference to the drawings, in which.

DETAILED DESCRIPTION

Figure 1:
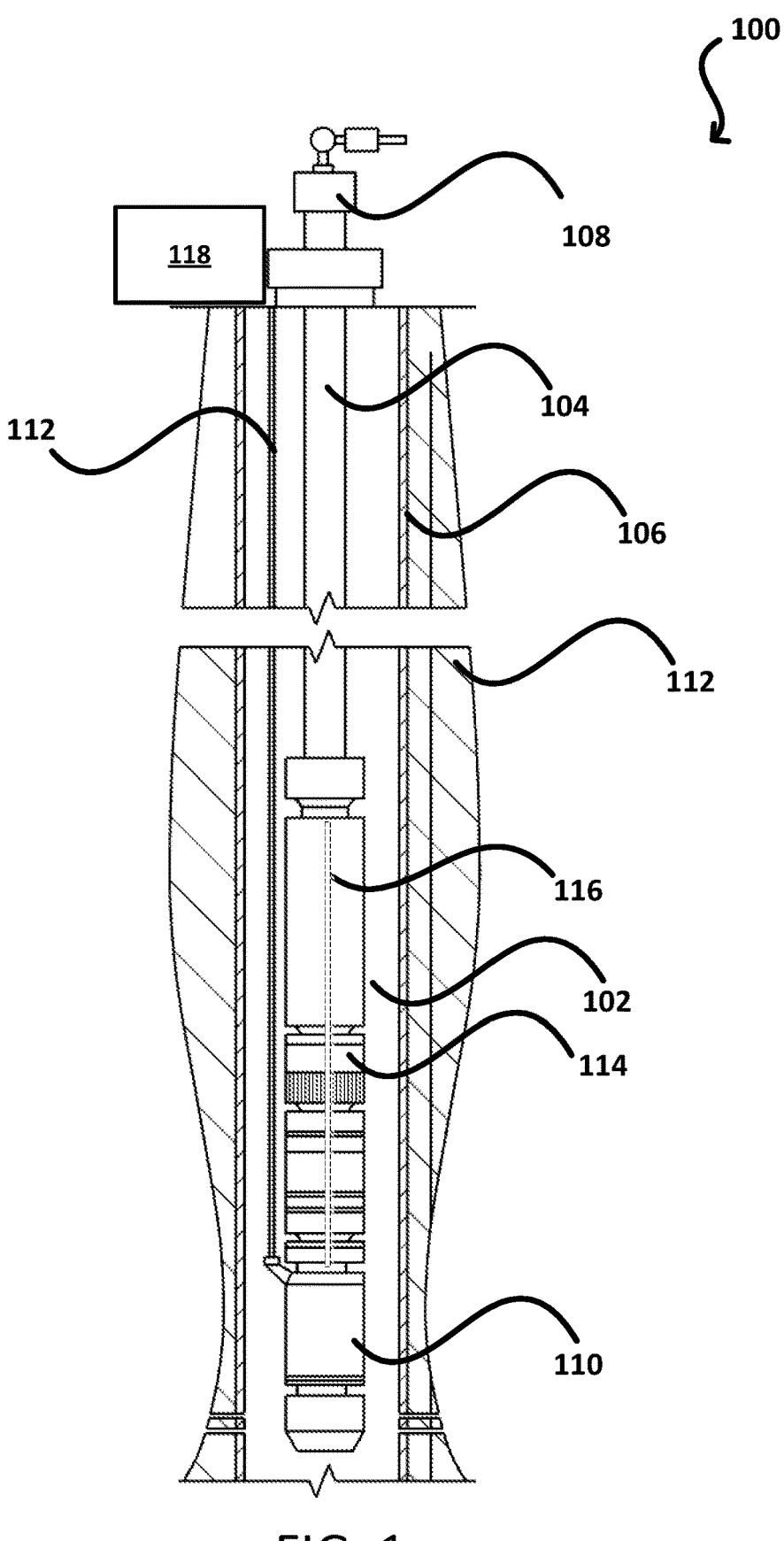
FIG. 1 illustrates an example sectional view of certain external features of a pumping system having a pump or pump assembly for pumping fluid, and which can be subject to aspects of at least one embodiment herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An impeller in a helico-axial, radial, or mixed flow path configuration of a pumping system or a pump may be subject to friction losses during pumping of fluid having particulates. Such friction losses can represent wasted energy in the form of heat. For example, as peripheral velocity is higher at an outside diameter of an impeller, friction losses may not be avoided. Such losses may be exacerbated by accumulation of particulates. Pumps or pumping systems that include electromagnetic features have areas provided to host one or more magnets, such as within one or more cavities inside the pump or pumping system. Such cavities may be sufficiently large to allow a single phase fluid or phases of a multi-phase fluid to seep through.

Such a pump or pumping system may include multiple stages and may be a helico-axial pump, a radial, or a mixed-flow pump. Such pumps may have an axial main flow path (that is substantially along an axis of rotation of an impeller), may have a radial main flow path (that is substantial in a zig-zag manner, as viewed in a two-dimensional cross section view, with respect to an axis of rotation of an impeller, or may have a combination of an axial and a radial main flow paths (referred to as a mixed main flow path). Each stage may have at least an impeller and a diffuser. There may be multiple blades for an impeller to impart centrifugal energy to the fluid there through.

When an impeller rotates, centrifugal force pushes particulates that maybe heavier elements to an outside (that is an inner surface) of a chamber enclosed by a casing that hosts such an impeller and diffuser as a stack. At the same time, lighter elements of a fluid may move towards a center of an axis (or hub) of such a stack. For example, liquid move towards the axis and sand moves out to an outer ring or shroud of a chamber enclosed by a casing hosting the stack. Further, a permanent magnet may be provided in each stage, as part of a motor rotor, and is located within a cavity that is at a top of a chamber within a pump. An electromagnet maybe provided within each stage, as part of the motor stator, to cause movement of the impeller portion of the stack. When this happens, sand and liquid may move through a channel or separation of a side flow path and into the cavity and cause erosion of the permanent magnet and of other surfaces.

As such, dense fluid having high viscosity, such as a single phase or a multi-phase fluid with particulates therein, may be in the region having one or more cavities. These particulates may be caused to accumulate in inner surfaces of a chamber within a pump or pumping system. Losses from friction losses or other causes that may be related to accumulation of particulates, may present as significant energy loss related to high temperatures during operation of a pump or pumping system. These actions within a pump or pumping system may lead also to mechanical issues. For example, friction from particulates may cause erosion to surfaces, but also to overcome such friction, more power may be provided to power features of a pump, which ultimately represents a decrease in efficiency of the pump or of a pumping system.

Features herein are described to address one or more of the above-referenced deficiencies. Various other functions can be implemented within the various embodiments as well as discussed and suggested elsewhere herein.

At least one protrusion, in the form of a fin or a vane, is provided within an inner surface of the side flow path to deflect particulates, such as sand, back into the main flow path that is distinct from the side flow path. Such at least one protrusion does not allow a substantial portion of the particulates in a fluid to enter the cavity and therefore prevents erosion of the permanent magnet and of other surfaces associated with such a side flow path.

In at least one embodiment, an impeller of an axial pump has multiple blades or vanes to impart energy to fluid when such blades or vanes rotate. Centrifugal force may be imparted in this manner to push heavy elements of a fluid, such as particulates, to an outside area of an inner surface of a chamber hosting such an impeller in a pump or pumping system. Lighter elements of a fluid may be forced to move toward a center or axis or hub of the impeller. As such, heavy liquid having sand may move out to an area referenced as a shroud of the chamber.

In at least one embodiment, the pump or pumping system has an electromagnet at a top, above the inner surface of the chamber to provide rotational control of the impeller via a permanent magnet that is part of a motor rotor. These aspects form power features for a pump or pumping system. The particulates, such as sand and some heavy liquids may erode the magnet and other surfaces. At least one protrusion in the form of a fin or a vane provided in association with an inner surface of a chamber and adjacent to a side flow path is able to deflect the particulates back into a main flow path.

Such features therefore prevent enter of particulates into a cavity hosting the permanent magnet. Friction losses, such as caused by a rotating part in a flow of fluid, occurs in such a pump or pumping system. Further, a certain amount of the fluid ends up moving around the blades and ends up being heated and imparting heat within surfaces of the pump or pumping system. This heat may represent wasted energy of a pump or pumping system. Still further, a higher radius of the pump or pumping system enables a higher peripheral velocity for the fluid at the edge of an impeller. The at least one protrusion allows a single phase fluid or gas or fluid of a multi-phase fluid to support deflection of particulates into the chamber. For example, gas phase of a multi-phase fluid, at a rotating surface, can provide some cushioning in addition to the at least one protrusion reducing the effects of particulates in a fluid. However, such gas may not be able to remove heat from friction losses. The fluid component of a multi-phase fluid can remove heat, so a balance may be provided by at least one protrusion that supports gathering or deflection of particulates away from a side flow path.

The pump rotor and pump stator are distinct from the motor rotor (having permanent magnets) and the motor stator (having an electromagnet to cause movement for the motor rotor). The impeller, forming the pump rotor, may be set into rotation by a pump shaft or bearing rotors and stators coupled to the impeller. However, the diffuser, forming the pump stator, is decoupled from such rotary movement and, therefore, does not rotate with respect to the impeller. The permanent magnet is associated with the impeller aspect of impeller-diffuser stack. The channel or separation associated with the side flow path therefore extends to the cavity having the permanent magnet. A path may be a course, direction, or flow of fluid, while a channel or separation is a structure that provides such a path. The use of the at least one protrusion can prevent particulates from this channel or separation, and therefore reduces friction losses by preventing a part or certain amount of multi-phase fluid (or at least the particulates) that goes around an impeller's blades from getting into the cavity and causing additional heat within the pump.

Further, such features are able to address the issue of wasted energy, in the form of heat, and is able to improve the efficiency of the pump or pumping system. Further, such benefits may be apparent when an impeller has a large radius, which can cause a peripheral velocity for multi-phase fluids to be proportionally higher. Gas turbines may not face such issues due to a lack of a similar cavity required for a permanent magnet or any association of stages of a pump together, but also due lower density of gas compared to a liquid-phase or a multi-phase fluid. A benefit of such an electric pump or pumping system is that multiple stages may be associated together for higher capacity and performance, relative to pumps or pumping without such stages. Further, in such electric pump or pumping system, each stage may be operated independently, such as at different rotations per minute (RPMs).

In at least one embodiment, while features described herein are able to mitigate particulate erosion, they can also provide an additional benefit in multi-phase fluid conditions relating to extraction or diversion of gas from the fluid of the main flow path to the side flow path. A benefit realized from such movement of gas into the side flow path is an overall increase in efficiency of the machine as the gas provides a direct cushioning effect to various mechanical aspects associated with the side flow path.

FIG. 1 illustrates an example sectional view of certain external features of a system 100 having a pump or pumping system 102 for pumping fluid, and which can be subject to aspects of at least one embodiment herein. A system 100 includes a pump or pumping system 102 that is associated with a fluid conduit 104. A pump or pumping system 102 and a portion of a fluid conduit 104 may be are positioned in a subterranean or subsea wellbore 106 of a subterranean or subsea environment 112. A fluid conduit 104 may be associated between a pump or pumping system 102 and a wellhead 108. The wellhead 108 may be located at a surface level in reference to a subterranean or subsea environment 112.

In at least one embodiment, the system 100 in FIG. 1, with benefits from features imparted herein, may be used in other environments, such as in an above-ground environment for purposes of transferring a multi-phase fluid from one storage location to another. In one example, a wellbore 106 may be used for oil production. Petroleum then forms a multi-phase fluid that can include gaseous and liquid phases, and may include dispersed particulates. Petroleum refers broadly to mineral hydrocarbons, such as crude oil, natural gas, and combinations of oil and gas.

In at least one embodiment, the system 100 in FIG. 1 may include at least one pump or pumping system 102 that has pump-specific components therein, an intake portion 114 that permits multiphase fluid within a wellbore 106 to enter the pump-specific components, and a pump driving mechanism 110, which can be an electric motor. A pump driving mechanism 110 may be coupled to an electrical power source 118 from above-ground location and through a power cable 112. Further, a pump driving mechanism 110 may be a type of driving mechanism that permits a pump or pumping system 102 to operate as described herein, such as to process or to work with multi-phase fluid and to support multiple stages.

Still further, a shaft 116 may extend from a pump driving mechanism 110 to the pump-specific components in the pump or pumping system 102. While illustrated externally, such a shaft is internal to the pump or pumping system 102 and may transfer movement enabled by the pump driving mechanism 110 to an impeller of the pump or pumping system 102. As such, the shaft 116 may be within a fluid conduit 104.

Figure 2:
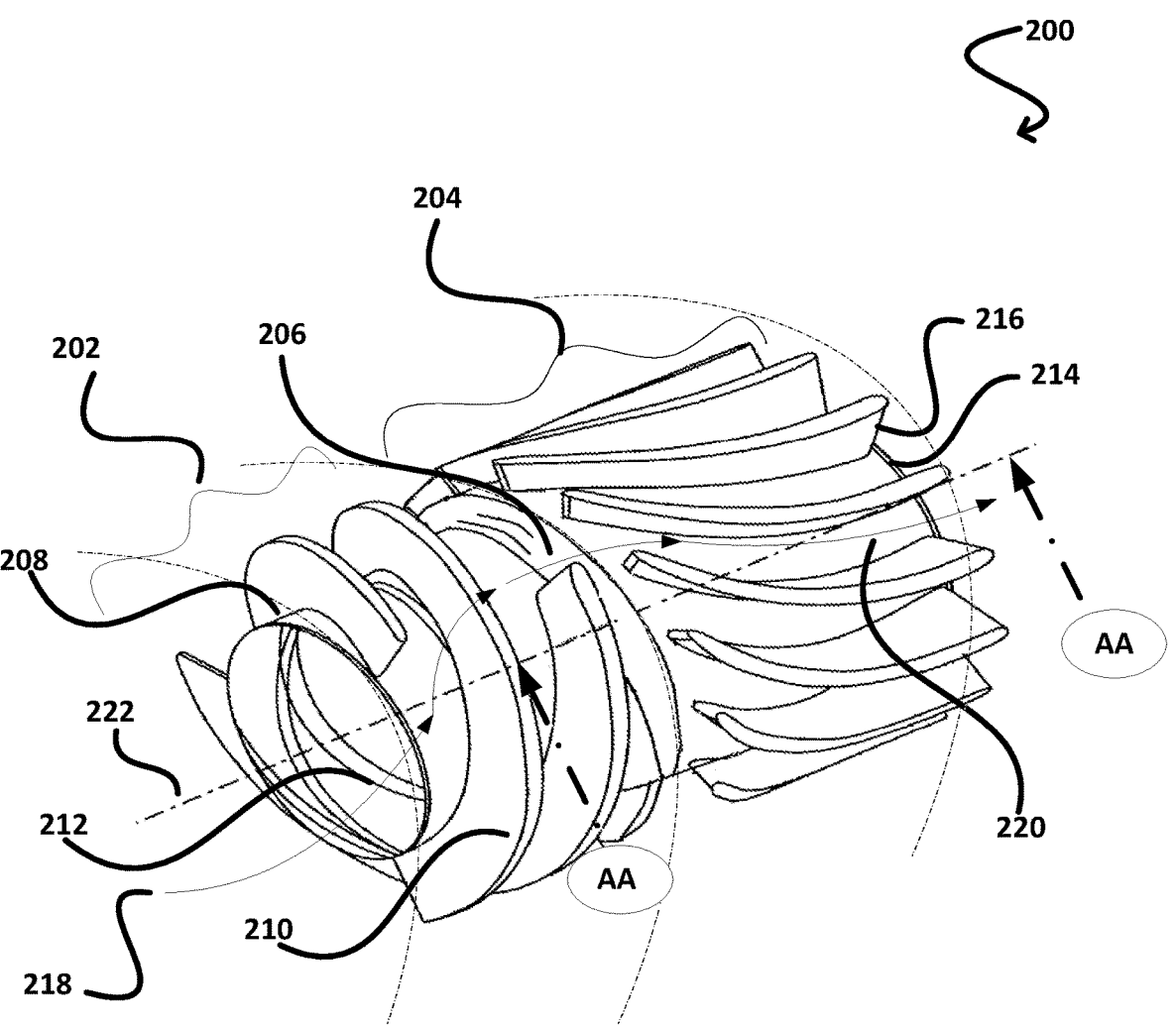
FIG. 2 illustrates a perspective view of a movable blade forming all or part of a pump rotor and a fixed diffuser forming all or part of a pump stator for a pumping system or pump for pumping fluid, in accordance with at least one embodiment.

FIG. 2 illustrates a perspective view of movable blades or vanes 210 of an impeller 202 forming all or part of a pump rotor and a fixed diffuser 204 forming all or part of a pump stator (together forming a subsystem 200) for a pumping system or pump for pumping fluid, in accordance with at least one embodiment. As such, in FIG. 2, a pump rotor 202 and pump stator 204 are distinct from a motor rotor and motor stator. Further, movable blades or vanes 210 are movable as part of a rotation motion, along with a hub 208, to which it is associated.

Such a subsystem 200 in FIG. 2 may be used within a pump or pumping system 102 of FIG. 1. In an exemplary embodiment, a pump rotor 202 includes a rotor hub 208 and a multiple pump vanes or blades 210, which may be helical vanes or blades. In at least one embodiment, an inducer may be provided and may have its own inducer vanes or blades. A flow direction of the multi-phase fluid is indicated by the flow markers 206, 218 that is substantially parallel to central axis 222 of rotation of a subsystem 200, as illustrated in FIG. 2.

A pump rotor or impeller 202 receives, as illustrated by a flow marker 218, fluid at one or more of its blades or vanes 210 upstream from a diffuser portion 204. The pump rotor or impeller 202 provides such fluid out, illustrated by a flow marker 220, of the diffuser 204. For example, the fluid exits out from the diffuser's blades or vanes 216, at a downstream side from the impeller 202. In at least one embodiment, the diffuser 202 is mounted on a diffuser hub 214 that is distinct from an impeller hub 208. The impeller 202 rotates relative to the diffuser 204 that is static. Further, the impeller hub 208 may have gear variations to enable different relative speeds.

The impeller vanes or blades 210 may extend radially from an impeller hub 208 and may spiral downstream in a helical pattern about the axis 222 of rotation enabled for the subsystem 200 illustrated. In the exemplary embodiment, the impeller 202 may include multiple inducer vanes 210 that each extend circumferentially through a predetermined rotation degrees that is about the axis 222 of rotation of the subsystem 200. Further, an impeller 202 may include impeller vanes 210 extending about any rotation angle that permits a pump or pump system to operate as described herein. Still further, such vanes 210 may each include a leading-edge portion defining a leading edge and a trailing edge portion defining a trailing edge. In at least one embodiment, a provided area 212 of the subsystem 200 supports there through at least a bearing rotor (as described with respect to FIG. 4).

In at least one embodiment, the impeller vanes 210 are attached to an impeller hub 208. The impeller vanes 210 extend radially from impeller hub 208 and spiral downstream in a helical pattern, about central axis 224 of rotation of the subsystem 200. In the exemplary embodiment, a determined number of impeller vanes 210 includes nine impeller vanes that each extend circumferentially through a rotation angle of about 45 degrees about central axis 222 of rotation of the subsystem 200. A determined number of impeller vanes 210 may include any number of impeller vanes 210 extending at about any rotation angle that altogether permits a pump or pumping system having the subsystem 200 to operate as described herein, such as allowing a substantially axial flow 218, 220 there through. The impeller vanes 210 may each include a leading-edge portion defining a leading edge and a trailing edge portion defining a trailing edge.

Figure 3:
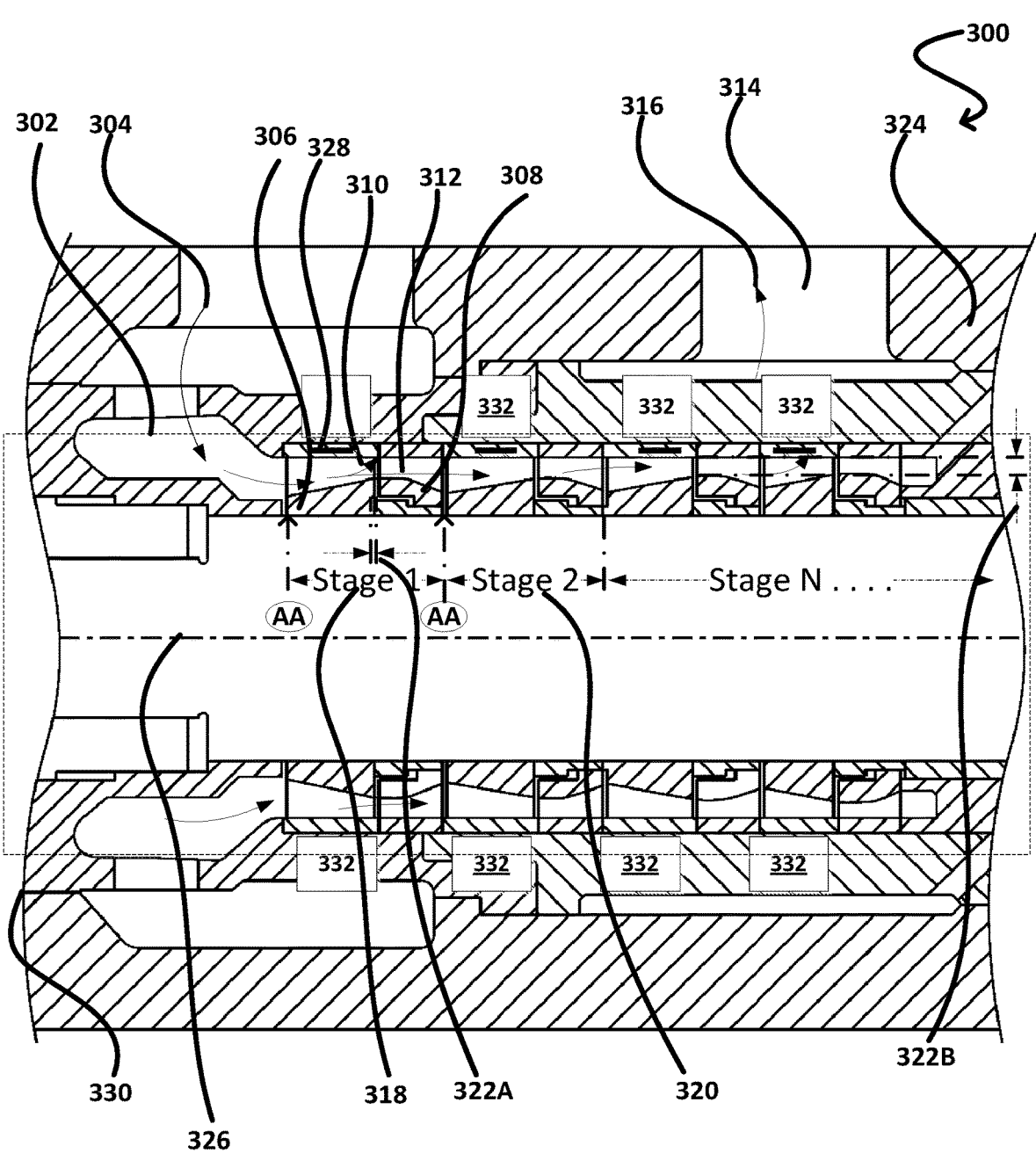
FIG. 3 illustrates a sectional view of certain internal features of a pumping system or pump for pumping fluid, in accordance with at least one embodiment.

FIG. 3 illustrates a sectional view of certain internal features 300 of a pumping system or pump for pumping fluid, in accordance with at least one embodiment. In at least one embodiment, such a sectional view is during operation of a pump or pumping system. The internal features 300 include, for example, a sectional representation 306, 308 of an impeller 202 and diffuser 204 stack, from FIG. 2, but as part of a pump or pumping system 324. The impeller 306 may be mounted on a shaft (or a bearing rotor and stator) aligned with illustrated axis 326 of the pump or pumping system 324. The diffuser may be decoupled from rotational movement and may be associated with an inner surface of a chamber 330. As such, FIG. 3 illustrates that a provided inlet 302 allows entry 304 of the multi-phase or single-phase fluid (also referred to as fluid) into a chamber 330 of the system. The chamber 330 will be readily understood as all areas, within the pump or pump system 324, through which the fluid flows and encompasses all component from an inlet to an outlet of the pump or pumping system 324.

There may be additional features in a pump or pumping system 324 that is addressed in one or more of the other FIGURES herein. The stack is, therefore, in an arrangement allowing an outlet from one stage pass fluid to an inlet of the next stage, and so on, through which the fluid passes. In at least one embodiment, one stage may be an axial flow stage and the next stage may be a radial flow stage. For example, fluid enters 304 into a pump or pumping system 324 through an inlet 302. The fluid first encounters the impeller 306 (which may be one of the vanes 210, in a section view from plane AA of FIG. 2) within the pump or pumping system 324. The fluid then encounters the diffuser 308 (which may be one of the vanes 216, in a section view from plane AA of FIG. 2). The pump or pumping system 324 enables fluid pressure of the fluid to be increased from a suction pressure to a delivery pressure as it passes through each impeller 306 stage. Further, kinetic energy of the fluid may be converted into further pressure in each diffuser 308 stage. A final result is a compression applied to the fluid finally exiting 316 the pump or pumping system 324.

The chamber has a side flow path 310, which is illustrated by a first width measurement 322A that is of a smaller width than a main flow path 312, which is illustrated by a second width measurement 322B that is taken from the area between the impeller blades and the diffuser blades through which the fluid flows. While there may be narrowing and broadening of such a main flow path 312, the second width measurement 322B representing the narrowest width in the main flow path 312 is still greater than the widest width of the side flow path 310. Further, a direction of fluid flow is illustrated, from the entry flow direction marker 304 at the inlet 302 and to an exit flow direction marker 316 at the outlet 314. The width This is described further in FIGS. 4-6. The flow path is in reference to the flow of fluid, while a channel or separation is in reference to areas within which the flow path occurs.

In at least one embodiment, while features described herein are able to mitigate particulate erosion for components in the side flow path, they can also provide an additional benefit in multi-phase fluid conditions relating to extraction or diversion of gas from the fluid of the main flow path to the side flow path. As noted throughout the disclosure herein, such movement of gas into the side flow path can support an overall increase in efficiency of the machine as the gas provides a direct cushioning effect to various mechanical aspects, such as the permanent magnet and mechanical aspects associated with the movement between the impeller and the diffuser.

The side flow path 310 is located between at least one movable blade 306 and at least one diffuser 308 and is located on a motor rotor side that is opposite to the movable blade and the diffuser. For example, the side flow path 310 is located at an inner surface of the chamber 330. As there are multiple stages 318, 320, each stage 318; 320 provides part of the main flow path 312. The main flow path 312 is, therefore, shared through the multiple stages 318, 320. Further, the side flow path 310 is provided by a channel (as illustrated in and discussed with respect to FIGS. 4-6). The channel may lead to a cavity hosting a permanent magnet 328, and this is the case in each stage 318, 320 of the pump or pumping system 324. Power features, including an electromagnet stator 332 and the permanent magnet rotor 328 can cause the at least one movable blade 306 to impart a centrifugal force to the fluid within the chamber 330.

Figure 4A:
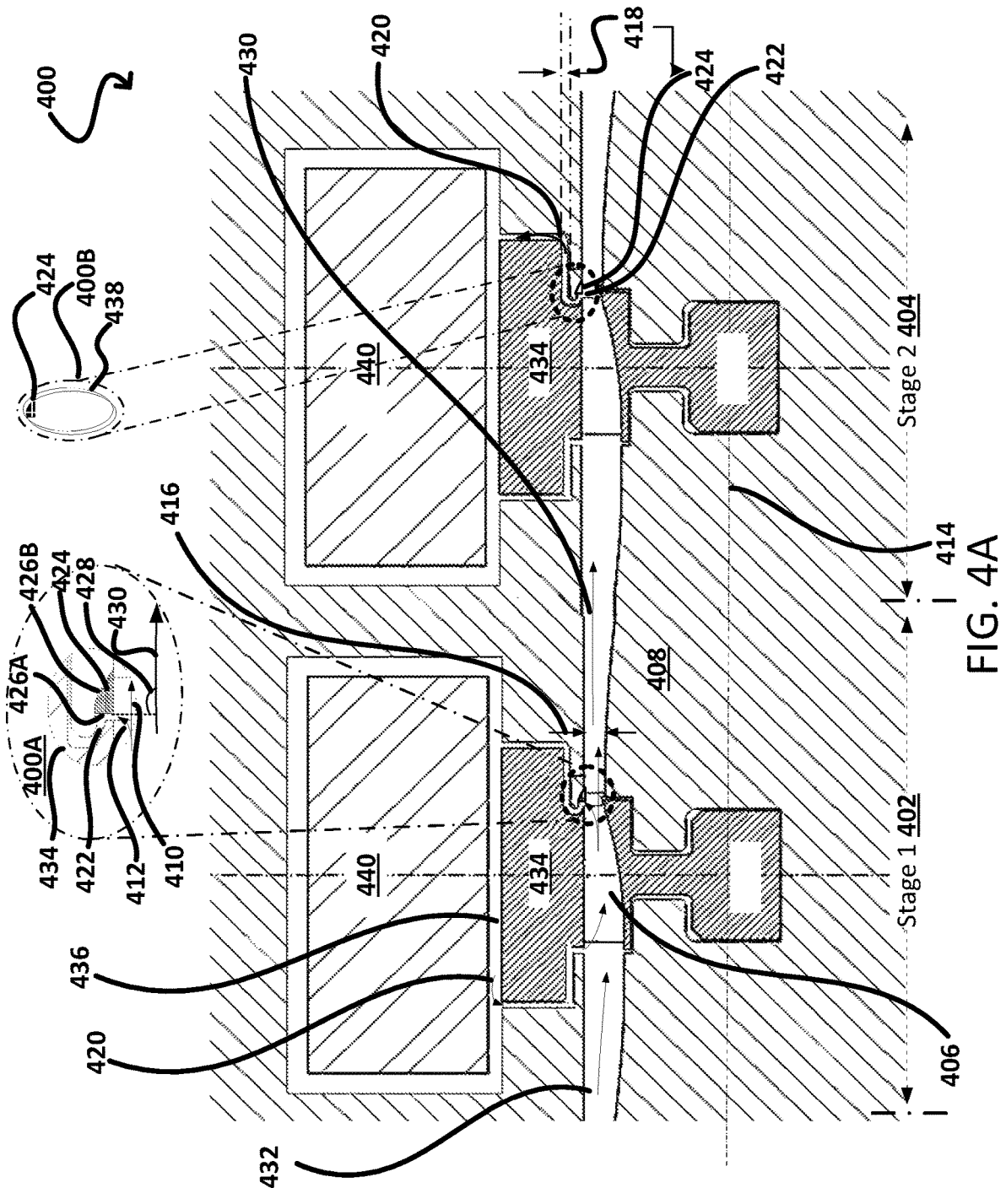
FIGS. 4A and 4B illustrate a further sectional view of certain internal features of a stage within a pumping system or pump for pumping fluid, in accordance with at least one embodiment.

FIG. 4A illustrates a further sectional view of certain internal features 400 of a stage (such as stage 1 318) within a pumping system or pump for pumping a multi-phase fluid, in accordance with at least one embodiment. FIG. 4A illustrates a first stage 402 and part or all of a second stage 404 of a multi-stage pump or pumping system for single phase or multi-phase fluid. Further, the pump or pumping system in FIG. 4A is a helico-axial pump or pumping system, as the main flow path 410, 430 is substantially along an axis 414 about which the impeller 406 rotates.

In FIG. 4A, fluid may also enter the pump or pumping system axially instead as illustrated in FIG. 3. An inlet 432 can allow the fluid into a chamber of the system. As FIG. 4A only illustrates an excerpt having certain internal features 400 of a stage of a pump or pumping system, a lower boundary and side boundaries marking the ends of the chamber are not illustrated. However, as discussed in FIG. 3, such a chamber encompasses all components from an inlet to an outlet of the pump or pumping system. The chamber 432 has a side flow path 412, 420 that is of a smaller width 418 than a width 416 of a main flow path 410, 430. The side flow path 412, 420 is located between at least one movable blade 406 (representing a side profile of a vane or blade of the impeller) and at least one diffuser 408 (representing a side profile of a vane or blade of the diffuser).

Power features of the pump or pumping system include a permanent magnet 434 that may be encased in a shroud or a rotor sleeve 436. Power features also include an electromagnet 440 forming all or part of a motor stator positioned above the permanent magnet 434 forming all or part of a motor rotor, such as in a housing of the pump or pumping station, as illustrated in FIG. 5. The power features can cause the at least one movable blade 406 to impart a centrifugal force to the fluid within the chamber. Further, at least one protrusion 424 is located on an inner surface of the side flow path 412, 420. In addition, the at least one protrusion 424 is located between the at least one movable blade 406 and the at least one diffuser 408 because the side flow path 412 is formed of a channel or separation 422 between the at least one movable blade 406 and the at least one diffuser 408. As the fluid flows through the main flow path 410, 430, some part of such fluid may seep into the side flow path 412, 420 through the channel or separation 422 between the movable blade 406 and the diffuser 408.

The fluid seeping through the channel or separation 422 and into the side flow path has particulates that may affect the surfaces within the side flow path 412 and that may affect the permanent magnet 434 in the shroud around the cavity holding the permanent magnet 434, if it erodes sufficient material. Further detail of the at least one protrusion 424 is illustrated in callout 400A. The at least one protrusion 424 can cause the particulates to gather near a leading edge 426A of the at least one protrusion 424. A lagging edge 426B may have attachment features to enable attaching the lagging edge 426B to the inner surface of the channel 422. The at least one protrusion 424 can also can cause the particulates to divert from a direction associated with at side flow path 412, such as, from going into the channel or separation 422 of the side flow path 412, 420, and instead encouraging the particulates to fall into the main flow path 410, 430. In at least one embodiment, the gathered particulates will fall back into the main flow path over time once sufficient mass gathers, but at least does not enter the channel or separation 422 of the side flow path 412, 420.

In at least one embodiment, a removable ring or seal can be adapted to include the at least one protrusion 424 so that it may be removably affixed into the channel or separation of the side flow path 412, 420. For example, a circumferential seal may be provided to sit within the separation or channel 422. However, certain areas of the seal may be subject to deterioration due to the particulates in the fluid. As such, the seal may be adapted to include at least one protrusion 424 that may be replaced as it deteriorates. The seal may have at least one protrusion 424 that is integral to the seal, in at least one embodiment.

The internal features 400 of FIG. 4 include the channel or the separation 422 associated with the side flow path 412, 420 and further associated with a cavity, such as within the shroud 436. The channel or separation 422 is located on a motor stator side and opposite the at least one impeller 406. The cavity 436 within the shroud can include a permanent magnet 434 to be controlled by an electromagnet of the housing of the pump or pumping system.

One or more motor stators may be located externally from the chamber. Then one or more permanent magnets 434 form part of a rotor and are located within a cavity 436 that is associated with the side flow path 412, 420. The pump stators can include electromagnets. An individual pump stator of the one or more stators may be located within an individual detachable stage 402 of the pump or pumping system. In at least one embodiment, a bearing rotor 416 enables the smooth rotation of an impeller 406 around a stator 440.

In at least one embodiment, the pump rotors can include permanent magnets 434, so that the at least one movable blade 406 (used interchangeably with the impeller), the at least one diffuser 408, and an individual pump rotor may be located within the individual detachable stage 402 of the pump or pumping system. The individual detachable stage 402 of the pump or pumping system can operate independent of another individual detachable stage 404 of the pump or pumping system.

Figure 6:
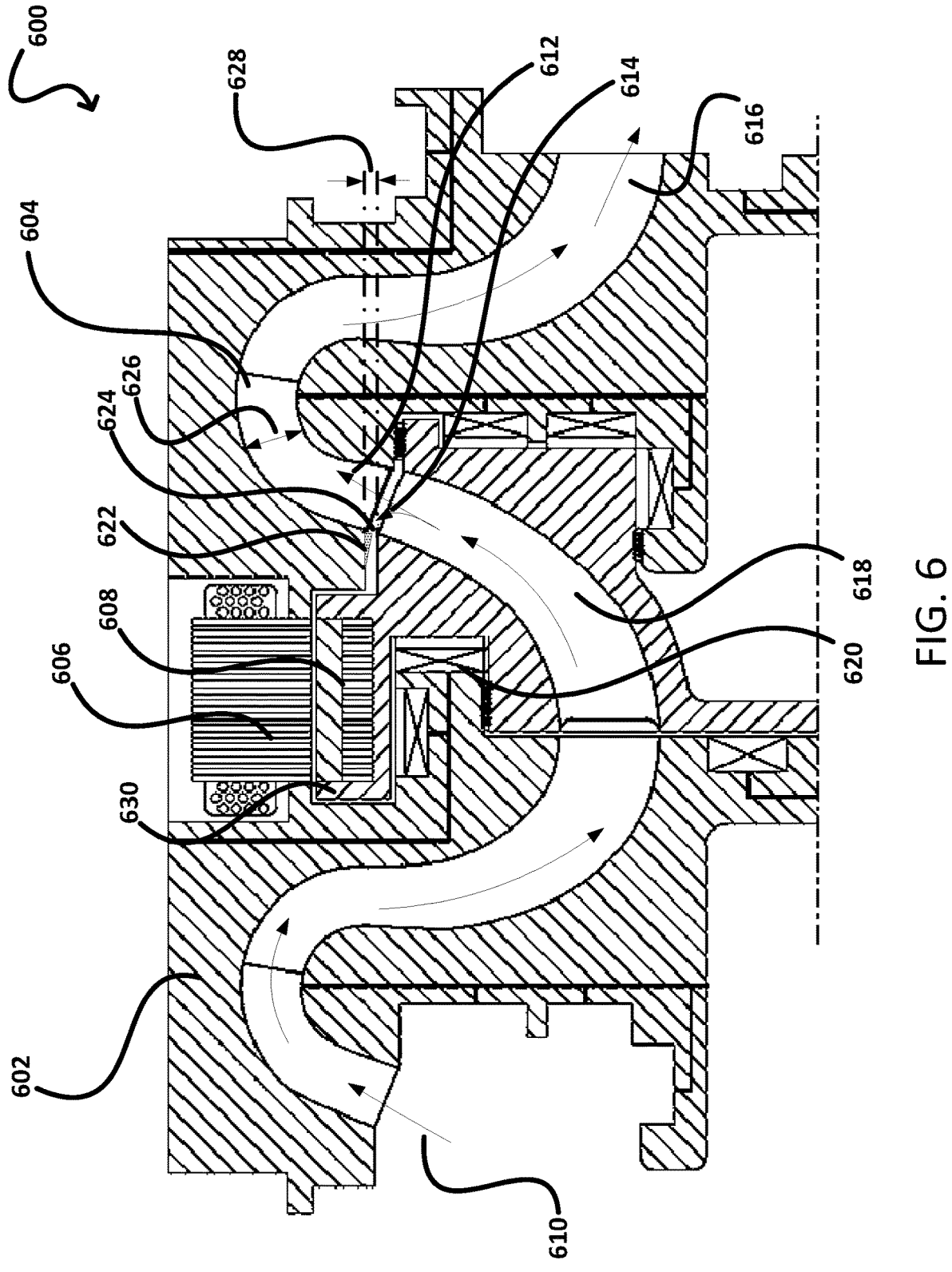
FIG. 6 illustrates a sectional view of certain internal features of a stage of a radial pumping system or pump for pumping fluid, in accordance with at least one embodiment.

Further, as will be illustrated in FIG. 4 and in FIG. 6, along with the supporting descriptions, a main flow path may be an axial flow path 410, 430 or may be a radial flow path. A side flow path 412, 420 may include a seal 438, in callout 400B, that may be within (such as, in an entry of) a channel 422 that provides part of the side flow path 412, 420. The seal 438 can include the at least one protrusion 424 thereon. The seal 438 may be an annular seal or structure that is slipped into a chamber of a pump or pumping system, and that sits within a channel (such as, in an entry of the channel where the entry is part of the channel) so that it is flush with an inner surface of a chamber. In this manner, an impeller can rotate without obstruction. Even though the seal 438 is illustrated at a smaller scale, the seal is an annular seal to fit against inner surfaces of the chamber and so, it has a diameter that is relative to an inner surface diameter of the chamber.

The pump or pumping system may be so that the at least one protrusion 424 is removably attached to an aspect of the chamber, such as to an entry of the channel 422 within the chamber, an inner surface of the chamber, or a seal 438 that may be permanently or removably located within the chamber. The at least one protrusion 424 may include an angle 428 with respect to a direction of the main flow path 430.

A removable ring or seal 438 can include the at least one protrusion 424 in a permanent or removable manner. Further, a first channel 422 can enable the side flow path 412, 420, while a second channel having entrance 432 and extending to support a main flow path 430, therefore, enables the main flow path. The at least one protrusion 424 may be located fully within the first channel 412, 420 or can extend into the second channel. Attachment positions may be provided for the at least one protrusion, such as, at its lagging surface 426B, so that it can be associated to an existing feature, such as, a seal 438, an inner surface of the chamber, or an entry of the channel or separation 422.

Figure 4B:
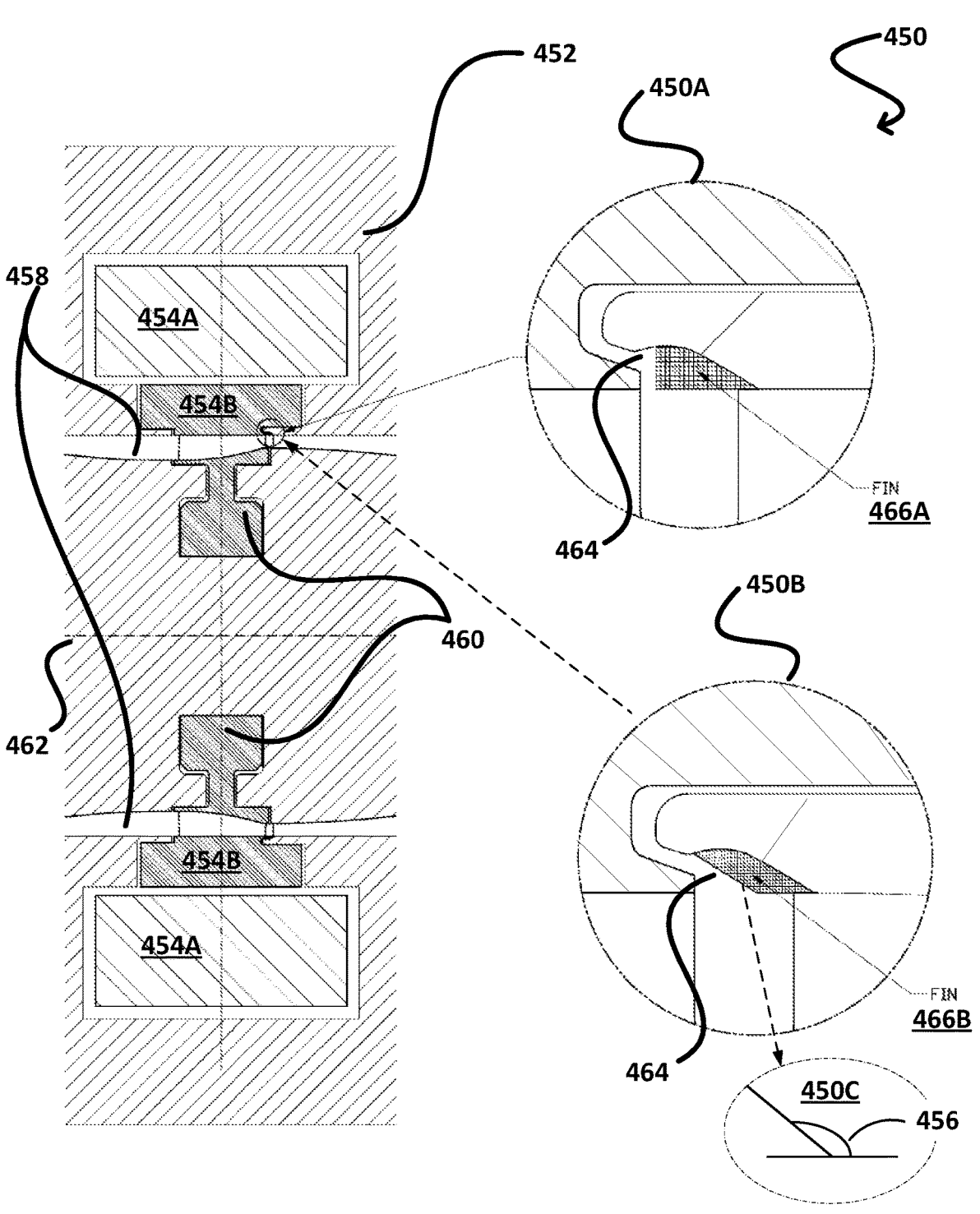

FIG. 4B illustrates a further sectional view of certain internal features 450 of a stage (such as stage 1 318) within a pumping system or pump for pumping fluid, in accordance with at least one embodiment. FIG. 4B illustrates a stator electromagnet 454A within a pump or pumping system 452 and a rotor permanent magnet 454B within a cavity that may be accessed by a first channel or separation 464 that supports a side flow path. A main flow path may be supported by a second channel or separation 458 that is distinct from the first channel or separation. For example, the second channel or separation is formed off impeller vanes and of diffuser vanes that may align to provide a path for fluid flow. Such a path may be axial or may be radial. Bearing rotors 460 can enable rotation of an impeller and its movable blades about an axis 462.

In at least one embodiment, different than a first protrusion or fin 466A in callout 450A, a second protrusion or fin 466B may be used concurrently or separation with the first protrusion or fin 466A in callout 450B. Further, as illustrated in callout 450C, such a second protrusion or fin 466B may have a different angle 456 relative to an axis 462 of a pump or pumping system (or relative to an axial direction of flow) than the angle 428 illustrated in FIG. 4A and in the callout 450A.

In at least one embodiment, a main flow path provided by an associated channel or separation 458 that is annular around an axis 462. Further, at least one protrusion, illustrated as a fin 466 may be provided on an inner surface of a side flow path supported by the first channel or separation 464. Such a first channel or separation 464 is between the at least one movable blade, represented by an impeller vane or blade, and the at least one diffuser. The at least one protrusion 466 can act on particulates of a multi-phase fluid traveling axially and travelling radially, where such radial travel may be enabled by centrifugal force from the at least one movable blade. The at least one protrusion 466 can cause the particulates to gather or can cause the particulates to divert from a direction associated with at side flow path and, instead, fall back into the main flow path.

Figure 4C:
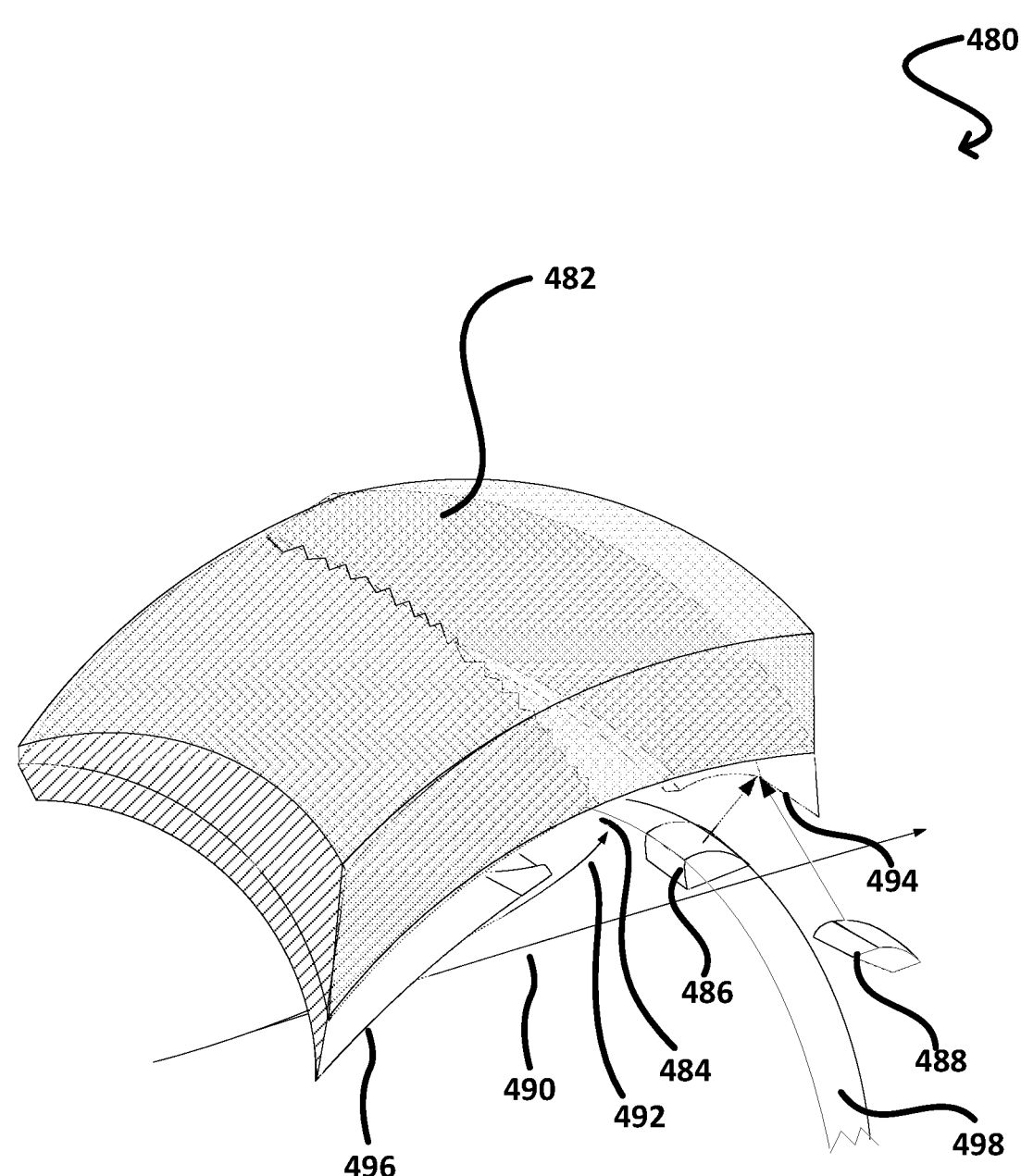
FIG. 4C illustrates aspects of a channel or separation in a chamber and of at least one protrusion used in an axial or radial pumping system or pump for pumping fluid, in accordance with at least one embodiment.

FIG. 4C illustrates aspects 480 of a channel or separation 484 in a chamber 482 and of at least one protrusion 486; 488 used in an axial or radial pumping system or pump for pumping fluid, in accordance with at least one embodiment. Even though the separation or channel 484 is illustrated are a substantial open area, it is understood that the channel and separation are of many orders smaller and only allow seeping of fluid there through. The channel or separation supports a pump rotor's configuration to rotate freely while the pump stator is static. A main flow path 490 is illustrated with a side flow path 492 through a channel or separation 484. To address particulates that may seep through the channel or separation 484 with the fluid of the side flow path, a protrusion or fin 486; 488 may be affixed to an inner surface 494 of the channel or separation 484.

The protrusion 486; 488 is such that it does not interfere with movement of the pump rotor and is flush with respect to an inner surface 496 of the chamber 482. Further, the protrusion 486; 488 is illustrated in at least two different shapes, but other shapes beneficial to the gathering or diversion of particulates from a side flow path 492 may be also considered. In at least one embodiment, an annular seal 498 having such a protrusion 486; 488 may be inserted into the channel or separation 484 so that its sits flush against the inner surface 494 of the channel or separation 484. Such a feature can allow for removal and replacement of the annular seal 498 if the protrusion is worn from the particulate interactions.

Figure 5A:
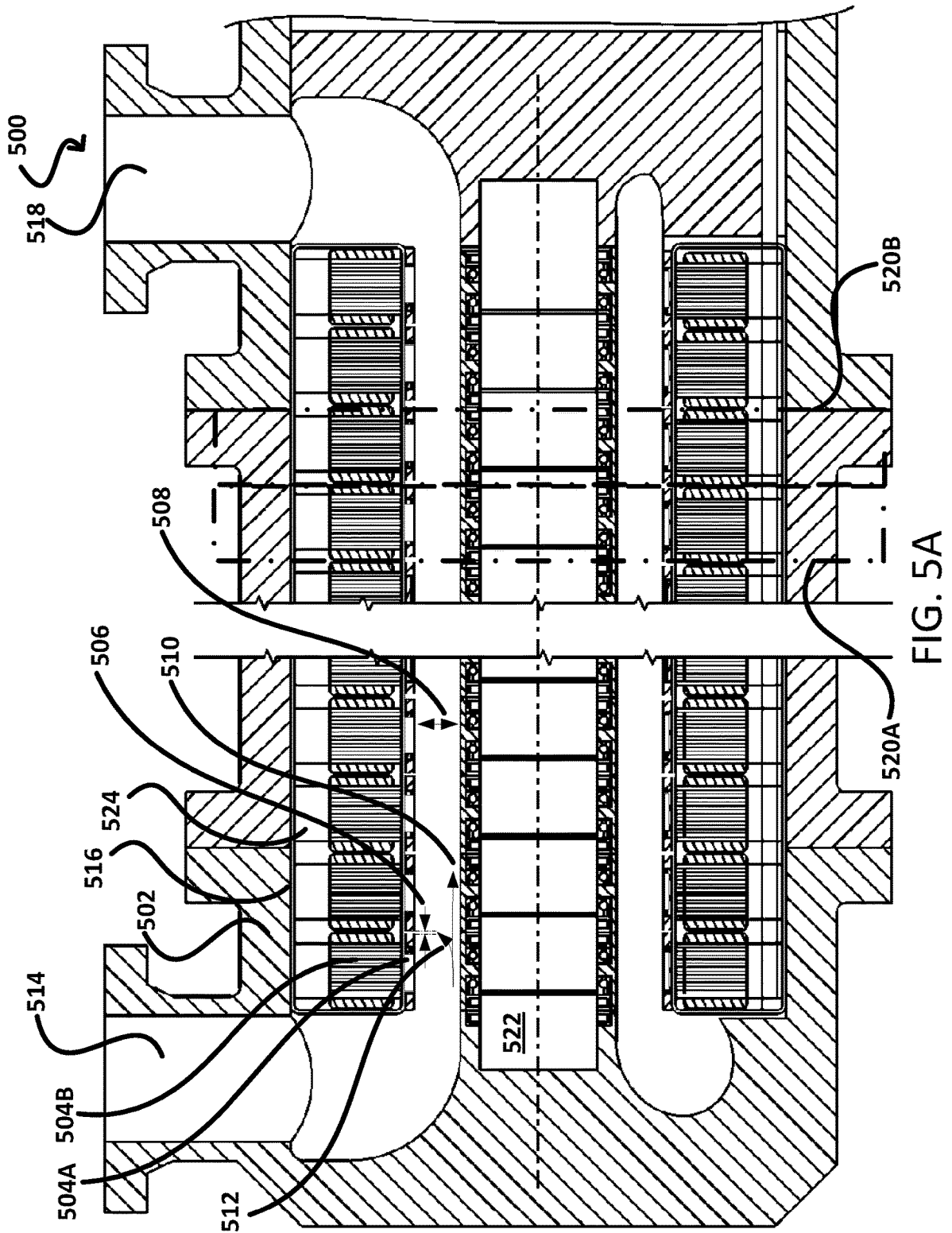
FIGS. 5A and 5B illustrate aspects in a sectional view of an arrangement of stages within an axial pumping system or pump for pumping fluid, in accordance with at least one embodiment.

FIG. 5A illustrates a sectional view of an arrangement 500 of stages 520A, B within an axial pumping system or pump 502 for pumping fluid, in accordance with at least one embodiment. The pumping system or pump 502 is for use with the multi-phase fluid that can have particulates, such as sand. An inlet 514 is provided to allow the fluid into a chamber 516 of the system. The chamber 516 has a side flow path 512 (illustrated by a flow direction or course) that has a smaller width 506 than a width 508 of a main flow path 510. The side flow path 512 may be located between at least one movable blade and at least one diffuser. Power features 504, 506 may be provided to cause the at least one movable blade to impart a centrifugal force to the fluid within the chamber 516. The power features can include a permanent magnet 504A and an electromagnet 504B.

At least one protrusion may be located on an inner surface of the side flow path 506 and between the at least one movable blade and the at least one diffuser. The at least one protrusion can cause the particulates to gather or can cause the particulates to divert from a direction associated with at side flow path 512 to a direction associated with the main flow path 510. The main flow path provides an exit for the fluid at an outlet 518.

The pump or pump system 502 may include a number of stages 520 A, B, which may be an even number of stages. The stages 520A, B may be arranged in pairs, where each pair includes a first stage and a second stage arranged in sequence in the direction of axis of the pump or pumping system 502. Further, each stage 520A; B may include a rotating impeller having the at least one movable blade that moves with the impeller. The impeller may be driven into rotation by a respective embedded motor.

In at least one embodiment, the impellers of two sequentially arranged stages of each pair may be counter-rotating type of impellers. This is so that the impellers are configured and controlled for rotating in two opposite directions, one in clockwise direction and the other in counter-clockwise direction. In each pair of stages 502A; B, a first impeller (such as the upstream-most impeller) rotates in one direction and a second impeller (such as a downstream-most impeller) rotates in a second direction that is opposite to the first direction. This is such that each impeller is rotating in one direction followed by its adjacent impeller rotating in the opposite direction.

Further, each stage 502A; B includes an impeller having, in each impeller, respective at least one movable blade or vane, which moves as the impeller moves and is not necessarily independent of the impeller. Each such blade or vane can be provided with a root portion, an airfoil portion and a tip portion. The blades or vanes are annularly-arranged blades or vanes in each impeller and the tip portion may form an outer ring or shroud. In at least one embodiment, the ring or shroud can be formed by a monolithic component. Similarly, the roots portion of the blades or vanes of each impeller can form a monolithic ring.

In at least one embodiment, each impeller in a stage may be supported by respective rotor bearings to be associated with an axle 522. The axle 522 may be stationarily mounted within the chamber enclosed by a casing 516 of a pump or pumping system 502. The rotor bearing can have a combined radial loading and axial loading capacity. For example, such rotor bearings can support both axial and radial loads. The rotor bearings can be lubricated and cooled by the liquid part of the fluid being processed by the pump or pumping system.

Each impeller of a stage rotates on an axle 522 independently of the other impellers from other stages. This is so that sequentially arranged impellers can rotate in opposite directions and at different angular speeds. Further, each stage 520A; B may be driven into rotation by a respective embedded electric motor that may form part of power features described throughout herein. Then the permanent magnets 504A form part of a permanent magnet electric motors (also referred to as PM electric motors). Switched or synchronous reluctance electric motors or variable reluctance electric motors can also be used with the pump or pumping system 502.

Each electric motor may include a motor rotor, represented in part by the permanent magnets 504A. Such a motor rotor rotates integrally with a respective impeller and rotates with respect to a motor stator 504B, represented in part by an electromagnet 504B, which is stationary with respect to the chamber enclosed by a casing 516. The motor rotor and the motor stator of each embedded motor are arranged radially, as one surrounds the other. The motor stator may be arranged outside the motor rotor. For example, the motor stator surrounds the respective motor rotor. A reverse arrangement can also be provided, with the motor rotor surrounding the respective motor stator.

In at least one embodiment, a motor rotor may be housed in or partly formed by the shroud of a respective impeller. The shroud can include the permanent magnets 504A. Each motor stator can include a number of electromagnets 504B (which is generally referenced in FIG. 5, but reference 504B may include coils and other features to enable such an electromagnet). For example, electromagnets 504B may be formed by ferromagnetic cores or yokes and by electric coils wound there around cores or yokes. Each yoke of a motor stator can comprise two radially extending arms around which electric coils are wound. Such arms may be oriented radially inwardly and the ends thereof, which can be provided with respective expansions may face a respective motor rotor. The yokes can be made of ferromagnetic material, such as, sheets of ferromagnetic metal. The yokes may also form a modular structure for the motor stator.

In at least one embodiment, motor stators (parts represented by reference 504B) may be isolated from an inner volume of the chamber enclosed by a casing where the impellers and the motor rotors (parts represented by reference 504A) are arranged. In at least one embodiment, a single liquid-tight annular housing 524 may be formed between an outer area of a casing 516 and an inner sheath. The motor stators may be housed in this tight annular housing 524. In at least one embodiment, the motor stator of each stage 520A; B can be liquid-tightly housed in a separate housing. In at least one embodiment, a number of such liquid-tight housings can be provided, where each housing has two or more motor stators (parts represented by reference 504B) of sequentially arranged stages 520A; B.

Figure 5B:
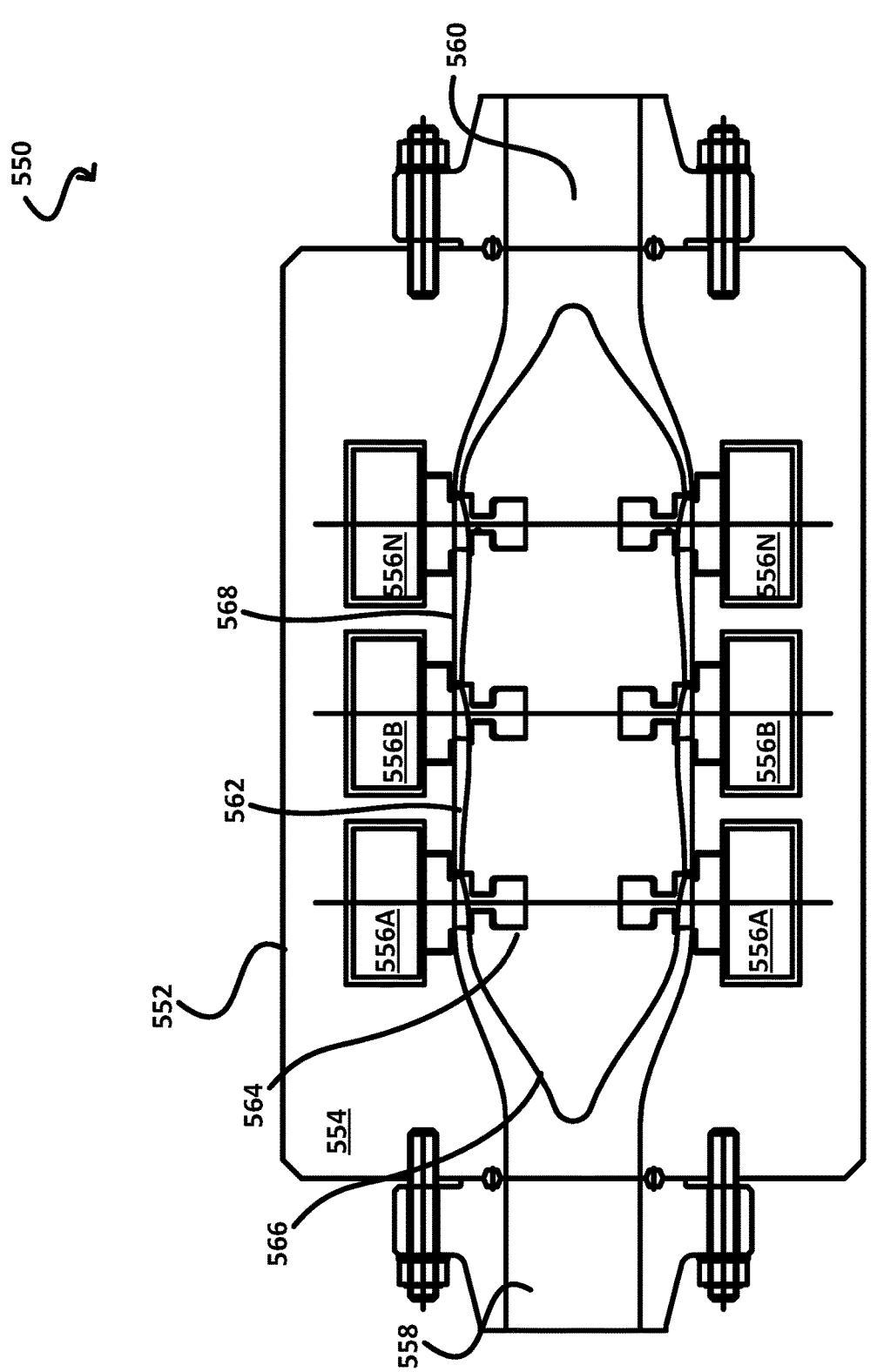

FIG. 5B illustrates aspects 550 in a sectional view of an arrangement of stages within an axial pumping system or pump for pumping fluid, in accordance with at least one embodiment. Different from FIG. 5A, FIG. 5B illustrates that fluid enters axially through an inlet 558 and exits axially via an outlet 560. Further, a shroud 556 formed of impeller blade tips is illustrated. Diffuser blade tips may form part of such a shroud 556. Multiple stages of an electromagnet stator 556A-N are illustrated. Each stage, on a rotor side may include a respective rotor permanent magnet 564. All such aspects 550 are enclosed within a chamber 554 by a casing 552. A main flow path is established by a channel or separation 562 above the shroud and between the shroud to an inner surface 568 of a chamber 554. A side flow path may be established at the inner surface 568 of the chamber 554.

FIG. 6 illustrates a sectional view of certain internal features 600 of a stage of a radial pumping system or pump for pumping fluid, in accordance with at least one embodiment. A pumping system or pump 602 (reference numeral marked to only one stage but will be understood to reference all stages combined) is for use with a fluid having particulates. Different than some of FIGS. 2-5B, the pumping system or pump 602 is part of a radial pump or pumping system as a main flow path 612 is radial and not axial. An inlet 610 is provided for the pump or pumping system 602 (reference numeral shows inlet to a stage, but the pump or pumping system 602 will have an inlet to supply the stage inlet). The inlet 610 is to allow a multi-phase fluid into a chamber formed by a casing. The chamber has a side flow path 614 that is of a first width 628, which is smaller than a second width 626 of a main flow path 612. The side flow path is located between at least one movable blade 618 (also referred to as an impeller) and at least one diffuser 604.

Further, power features 606, 608 represent an electromagnet stator and a permanent magnet rotor that may be used to cause the at least one movable blade 618 to impart a centrifugal force to the fluid within the chamber. At least one protrusion 622 may be located on an inner surface, such as, an entry 624 of the side flow path 614. Such an entry 624 is between the at least one movable blade 618 and the at least one diffuser 604. In at least one embodiment, the at least one protrusion 622 can cause the particulates to gather or can cause the particulates to divert from a direction associated with the side flow path 614, can instead allow the particulates to fall back and flow with the main flow path 612.

A removable ring or seal, in a manner described throughout herein, may be provided to include the at least one protrusion 622. A channel or separation, represented by an entry 624 is associated with the side flow path 614. Such a channel or separation may lead to a cavity 630 on a motor rotor side the is opposite to the at least one impeller 618. The cavity 630 can include a permanent magnet 608 to be controlled by an electromagnet 606 located within a housing of the pumping system or pump 602.

One or more pump stators (generally represented by reference numeral 606 for an electromagnet) may be located externally from the chamber. The one or more permanent magnets 608 may form part of a rotor and may be located within the cavity 630 that is associated with the side flow path 622, as illustrated. Further, pump stators 606 can include the electromagnets within provided housing, where an individual pump stator 606 is located within an individual detachable stage of the pump or pumping system 602, as discussed with respect to the axial pump or pumping system described throughout herein.

In at least one embodiment, the pump rotors can include permanent magnets, where at least one movable blade of an impeller, the at least one diffuser, and an individual pump rotor are located within each of the individual detachable stage of the pump or pumping system. The individual detachable stage of the pump or pumping system can operate independent of another individual detachable stage of the pump.

In at least one embodiment, a seal can be provided within a channel or separation 624. The seal can provide at least part of the side flow path 614 and can include the at least one protrusion 622. Further, the at least one protrusion 622 is removably attached to an aspect of the chamber, such as an inner surface of the side flow path or a channel or separation 624 enabling the side flow path. Still further, the at least one protrusion 622 include an angle with respect to a direction of the main flow path 612, as detailed with respect to the axial pump or pumping system of the other FIGURES. A removable ring or seal can also the at least one protrusion 622 and can be inserted into the entry 624 forming part of the channel or separation.

In at least one embodiment, a first channel 624 enables the side flow path 614 and a second channel, formed in part by blades 618 of an impeller, enables part of the main flow path 612. As such, a second channel may be interchangeably referenced, unless indicated otherwise, by the reference numeral of a blade or by the impeller 618. The at least one protrusion 622 may be located fully within the first channel 624 or to extend into the second channel, so long as there is a clearance between the blade 618 of the impeller. Attachment positions of the at least one protrusion 622 can be used to associate the at least one protrusion 622 to an existing feature of the chamber. An outlet 616 may be a stage outlet but extends to a final outlet of the fluid from the pump or pumping system 602. Further, multiple rotor bearings 620 may be provided in different angles to support the different loadings asserted on an impeller of such a pumping system or pump 602.

Figure 7:
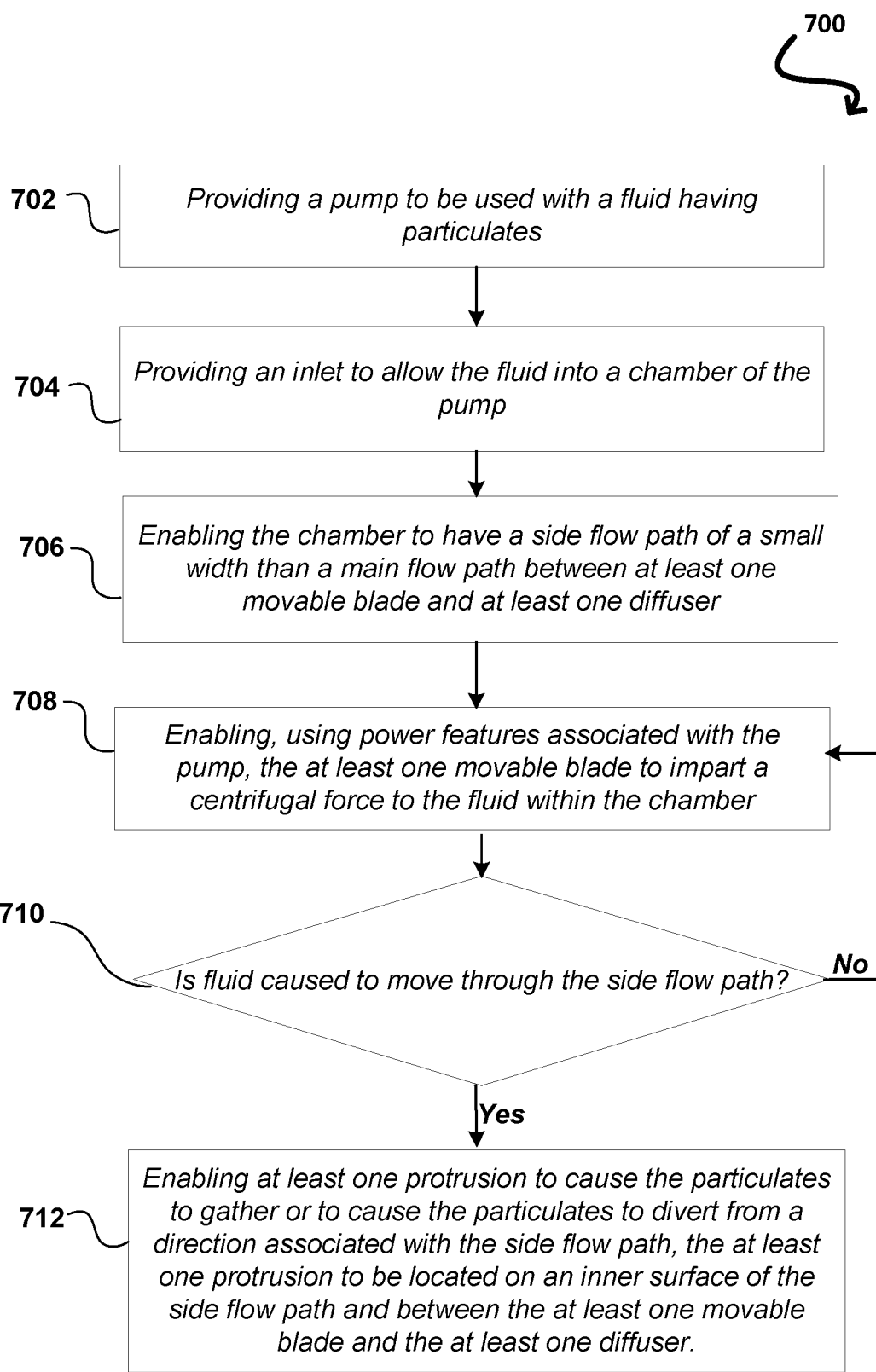
FIG. 7 illustrates a process flow for an example system as described with respect to one or more of FIGS. 1-6, in accordance with at least one embodiment.

FIG. 7 illustrates a process flow for an example system as described with respect to one or more of FIGS. 1-6, in accordance with at least one embodiment. The method includes a sub-process 702 for providing a pump to be used with a fluid having particulates. Sub-process 704 is for providing an inlet to allow the fluid into a chamber of the pump. Sub-process 706 is for enabling the chamber to include a side flow path that has a smaller width than a main flow path. The side flow path is enabled to be located between at least one movable blade and at least one diffuser.

Sub-process 708 is for enabling, using power features associated with the pump, the at least one movable blade to impart a centrifugal force to the fluid within the chamber. For example, power provided to coils of a stator electromagnet may enable the motor stator to control movement of the motor rotor, such as enabling movement of at least one movable blade of an impeller associated with the electromagnet. The movement of the at least one movable blade then imparts the centrifugal force into the fluid.

Sub-process 710 is to allow for a determination of fluid is caused to flow through a side flow path that is distinct from a main flow path. Such a determination may be done prior to providing a pump or pumping system with at least one protrusion, such as a fin. Such a determination may be a result of maintenance conducted on a pump and erosion observed for the pump. Such a determination may be required prior to associating together multiple stages of a pump or pumping system. Such a determination may be made by modeling a flow of a multi-phase fluid under conditions enabled by a pump or pumping system.

Sub-process 712 is for enabling at least one protrusion to cause the particulates to gather or to cause the particulates to divert from a direction associated with the side flow path. For example, the at least one protrusion may be located on an inner surface of the side flow path and between the at least one movable blade and the at least one diffuser. In at least one embodiment, sub-process 708 may be continued if particulates do not sufficiently disrupt features of a pump or pumping system. In at least one embodiment, sub-process 712 may be provided to an existing pump or pumping system as a result of sub-process 710. However, sub-process 712 may be provided irrespective of sub-process 710 or based on sub-process 710 applied to a different pump or pumping system.

A further sub-process or step of method 700 includes providing the at least one protrusion as a detachable feature to be used within the chamber. Another sub-process or step of method 700 includes providing a channel for the side flow path. The channel may be associated with a cavity located on a motor rotor side that is opposite to the at least one impeller. The cavity can include a permanent magnet to be controlled by an electromagnet of a housing of the pump. A further sub-process or step of method 700 includes enabling one or more pump stators to be located externally from the chamber. Still another sub-process or step of method 700 includes providing one or more permanent magnets to form part of a rotor and that is located within a cavity associated with the side flow path.

A further sub-process or step of method 700 includes providing pump stators with electromagnets, so that an individual pump stator is located within an individual detachable stage of the pump. Yet another sub-process or step of method 700 includes providing pump rotors with permanent magnets, with the at least one movable blade, with the at least one diffuser, and with an individual pump rotor. Such a sub-process or step provides these features to be located within an individual detachable stage of the pump. The individual detachable stage of the pump can operate independent of another individual detachable stage of the pump.

A further sub-process or step of method 700 includes enabling an axial or a radial flow path as the main flow path for the pump. Still another sub-process or step of method 700 includes enabling a seal within a channel to provide at least part of the side flow path. The seal includes the at least one protrusion.

The specification and drawings are, accordingly, to be regarded in an illustrative rather than a restrictive sense. It will, however, be evident that various modifications and changes may be made thereunto without departing from the broader spirit and scope of the invention as set forth in the claims. Further, any of the many embodiments disclosed here may be combined by a person of ordinary skill using the present disclosure to understand the effects of such combinations.

What is claimed is:

1. A system for use with a fluid having particulates, the system comprising:

an inlet to allow the fluid into a chamber of the system, the chamber having a side flow path comprising a smaller width than a main flow path and located between at least one movable blade and at least one diffuser;

power features to cause the at least one movable blade to impart a centrifugal force to the fluid within the chamber;

at least one protrusion comprising a fin or vane located on an inner surface of the side flow path and between the at least one movable blade and the at least one diffuser, the at least one protrusion being a separate structure than the inner surface and being shaped to fit the inner surface of the side flow path, and the at least one protrusion to cause the particulates to gather or to cause the particulates to divert from a direction associated with the side flow path; and a cavity on a motor rotor side that is opposite to at least one impeller, the side flow path leading to the cavity, wherein the at least one protrusion is configured to divert gas from the main flow path into the side flow path to provide gas cushioning.

2. The system of claim 1, further comprising:

a removable ring or seal to comprise the at least one protrusion.

3. The system of claim 1, further comprising:

a channel associated with the side flow path, and wherein the cavity comprising a permanent magnet to be controlled by an electromagnet of a housing of the system.

4. The system of claim 1, further comprising:

one or more pump stators located externally from the chamber; and one or more permanent magnets forming part of a rotor and located within a cavity associated with the side flow path.

5. The system of claim 1, further comprising:

pump stators to comprise electromagnets, wherein an individual pump stator is located within an individual detachable stage of the pump; and pump rotors to comprise permanent magnets, wherein the at least one movable blade, the at least one diffuser, and an individual pump rotor are located within the individual detachable stage of the pump, the individual detachable stage of the pump to operate independent of another individual detachable stage of the pump.

6. The system of claim 1, wherein the main flow path is an axial flow path, a radial flow path, or a mixed flow path.

7. The system of claim 1, further comprising:

a seal within a channel that provides at least part of the side flow path, the seal comprising the at least one protrusion.

8. A pump to work with particulates of a fluid, the pump comprising:

at least one protrusion comprising a fin or vane to be located on an inner surface of a side flow path that is distinct from a main flow path within the pump and further to be located between at least one movable blade and at least one diffuser, the at least one protrusion being a separate structure than the inner surface and being shaped to fit the inner surface of the side flow path, and the at least one protrusion to cause the particulates to gather or to cause the particulates to divert from a first direction associated with the side flow path and into a second direction associated with the main flow path; and a cavity on a motor rotor side that is opposite to at least one impeller, the side flow path leading to the cavity, wherein the at least one protrusion is configured to divert gas from the main flow path into the side flow path to provide gas cushioning.

9. The pump of claim 8, wherein the at least one protrusion is removably attached to an aspect of a chamber having the side flow path.

10. The pump of claim 8, wherein the at least one protrusion comprises an angle with respect to a direction of the main flow path.

11. The pump of claim 8, further comprising:

a removable ring or seal to comprise the at least one protrusion.

12. The pump of claim 8, further comprising:

a first channel to enable the side flow path and a second channel to enable the main flow path, the at least one protrusion located fully within the first channel or to extend into the second channel.

13. The pump of claim 8, further comprising:

attachment positions of the at least one protrusion to associate the at least one protrusion to an existing feature of a chamber having the side flow path.

14. A method for a pump to be used with a fluid having particulates, the method comprising:

providing an inlet to allow the fluid into a chamber of the pump, the chamber having a side flow path comprising a smaller width than a main flow path and located between at least one movable blade and at least one diffuser;

enabling, using power features associated with the pump, the at least one movable blade to impart a centrifugal force to the fluid within the chamber;

enabling at least one protrusion as a separate structure than an inner surface of the side flow path, the at least one protrusion comprising a fin or vane and being shaped to fit the inner surface of the side flow path and to cause the particulates to gather or to cause the particulates to divert from a direction associated with the side flow path, the at least one protrusion to be located on the inner surface of the side flow path and between the at least one movable blade and the at least one diffuser;

providing a cavity on a motor rotor side that is opposite to at least one impeller, the side flow path leading to the cavity; and effecting gas cushioning by the at least one protrusion diverting gas from the main flow path into the side flow path.

15. The method of claim 14, further comprising:

providing the at least one protrusion as a detachable feature to be used within the chamber.

16. The method of claim 14, further comprising:

providing a channel for the side flow path, the channel associated with the cavity, the cavity comprising a permanent magnet to be controlled by an electromagnet of a housing of the pump.

17. The method of claim 14, further comprising:

enabling one or more pump stators to be located externally from the chamber; and providing one or more permanent magnets to form part of a rotor and located within a cavity associated with the side flow path.

18. The method of claim 14, further comprising:

providing pump stators with electromagnets, wherein an individual pump stator is located within an individual detachable stage of the pump; and providing pump rotors with permanent magnets, wherein the at least one movable blade, the at least one diffuser, and an individual pump rotor are located within the individual detachable stage of the pump, the individual detachable stage of the pump to operate independent of another individual detachable stage of the pump.

19. The method of claim 14, further comprising:

enabling an axial flow path, a radial flow path, or mixed flow path as the main flow path for the pump.

20. The method of claim 14, further comprising:

enabling a seal within a channel to provide at least part of the side flow path, the seal comprising the at least one protrusion.

\* \* \* \* \*